(12) United States Patent
Saito et al.

(10) Patent No.: US 11,021,129 B2
(45) Date of Patent: Jun. 1, 2021

(54) OCCUPANT RESTRAINT DEVICE

(71) Applicant: AUTOLIV DEVELOPMENT AB, Vargarda (SE)

(72) Inventors: Hiroyuki Saito, Yokohama (JP); Tetsuya Matsushita, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 144 days.

(21) Appl. No.: 16/274,385

(22) Filed: Feb. 13, 2019

(65) Prior Publication Data

US 2019/0248323 A1   Aug. 15, 2019

(51) Int. Cl.
| | |
|---|---|
| *B60R 21/231* | (2011.01) |
| *B60R 21/217* | (2011.01) |
| *B60R 21/2338* | (2011.01) |
| *B60R 21/207* | (2006.01) |

(52) U.S. Cl.
CPC ...... *B60R 21/23138* (2013.01); *B60R 21/207* (2013.01); *B60R 21/2176* (2013.01); *B60R 2021/23146* (2013.01); *B60R 2021/23386* (2013.01)

(58) Field of Classification Search
CPC ........ B60R 21/207; B60R 2021/23146; B60R 2021/23386; B60R 21/2338; B60R 21/2176; B60R 21/23138; B60R 2021/23107

See application file for complete search history.

(56) References Cited

U.S. PATENT DOCUMENTS

| | | | | | |
|---|---|---|---|---|---|
| 2,873,122 | A | * | 2/1959 | Peras | B60R 21/02 280/29 |
| 3,218,103 | A | * | 11/1965 | Boyce | B60R 21/16 297/466 |
| 3,623,768 | A | * | 11/1971 | Capener | B60N 2/757 297/330 |
| 3,692,327 | A | * | 9/1972 | Barrick, Sr. | B60R 21/08 280/749 |
| 3,722,951 | A | * | 3/1973 | Ezquerra | B60R 21/02 297/488 |
| 3,753,576 | A | * | 8/1973 | Gorman | B60R 21/207 280/730.1 |
| 3,827,716 | A | * | 8/1974 | Vaughn | B60R 22/26 280/730.1 |
| 3,837,670 | A | * | 9/1974 | Hilyard | B60R 21/02 280/753 |

(Continued)

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

An occupant restraint device including: right and left airbags stored inside right and left sides of a seat back of a vehicle seat, respectively; right and left tension cloths connected to outer surfaces of the right and left airbags, respectively; and a lower tension cloth disposed inside a seat cushion of a vehicle seat, the lower tension cloth being continuously connected between lower parts of the right and left tension cloths. The lower tension cloth is movable in right and left directions with respect to an occupant sitting in the vehicle seat. When the right and left airbags are expanded and deployed, the right tension cloth, the left tension cloth, and the lower tension cloth are configured to push the expanded and deployed right and left airbags toward the occupant.

20 Claims, 6 Drawing Sheets

(56) References Cited

U.S. PATENT DOCUMENTS

| | | | | |
|---|---|---|---|---|
| 3,953,049 A * | 4/1976 | Surace | B60R 21/08 | 280/730.1 |
| 3,981,520 A * | 9/1976 | Pulling | B60N 2/4221 | 280/730.2 |
| 4,081,156 A * | 3/1978 | Ideskar | B64D 25/02 | 244/122 AG |
| 4,215,835 A * | 8/1980 | Wedgwood | B64D 25/02 | 244/122 AG |
| 4,359,200 A * | 11/1982 | Brevard | B64D 25/06 | 244/122 AG |
| 4,436,262 A * | 3/1984 | Cummings | B64D 25/10 | 244/122 AG |
| 4,440,443 A * | 4/1984 | Nordskog | B64D 11/00154 | 297/397 |
| 4,508,294 A * | 4/1985 | Lorch | B64D 25/02 | 244/122 AG |
| 4,592,523 A * | 6/1986 | Herndon | B64D 25/02 | 244/122 AG |
| 4,667,902 A * | 5/1987 | Zenobi | B64D 25/02 | 244/122 A |
| 4,749,153 A * | 6/1988 | Herndon | B64D 25/10 | 244/122 A |
| 5,232,243 A * | 8/1993 | Blackburn | B60N 2/002 | 177/144 |
| 5,301,903 A * | 4/1994 | Aronne | B64D 25/02 | 244/122 AG |
| 5,464,246 A * | 11/1995 | Castro | B60R 21/08 | 244/122 AG |
| 5,470,103 A * | 11/1995 | Vaillancourt | B60R 21/214 | 280/730.1 |
| 5,499,840 A * | 3/1996 | Nakano | B60N 2/0705 | 280/730.1 |
| 5,636,862 A * | 6/1997 | Cheung | B60R 21/207 | 280/730.2 |
| 5,785,347 A * | 7/1998 | Adolph | B60R 21/01556 | 180/273 |
| 6,018,693 A * | 1/2000 | Blackburn | B60R 21/01536 | 180/268 |
| 6,027,138 A * | 2/2000 | Tanaka | B60N 2/002 | 250/559.22 |
| 6,029,993 A * | 2/2000 | Mueller | B60R 21/23138 | 280/730.2 |
| 6,033,017 A * | 3/2000 | Elqadah | B60N 2/2222 | 297/216.1 |
| 6,113,185 A * | 9/2000 | Yamaguchi | B60N 2/4221 | 280/748 |
| 6,123,357 A * | 9/2000 | Hosoda | B60N 2/002 | 280/730.2 |
| 6,158,812 A * | 12/2000 | Bonke | B60R 16/08 | 297/391 |
| 6,199,902 B1 * | 3/2001 | Cooper | B60R 21/01532 | 280/734 |
| 6,237,945 B1 * | 5/2001 | Aboud | B60R 21/18 | 280/730.2 |
| 6,254,181 B1 * | 7/2001 | Aufrere | B60N 2/4221 | 297/216.1 |
| 6,308,917 B1 * | 10/2001 | Ruff | B64D 25/02 | 244/122 AG |
| 6,315,245 B1 * | 11/2001 | Ruff | B64D 25/02 | 244/122 AG |
| 6,428,041 B1 * | 8/2002 | Wohllebe | B60R 21/2155 | 280/729 |
| 6,572,137 B2 * | 6/2003 | Bossecker | B60R 21/207 | 280/730.1 |
| 6,935,684 B2 * | 8/2005 | Sakai | B60N 2/4221 | 297/216.1 |
| 6,942,248 B2 * | 9/2005 | Breed | B60N 2/853 | 280/735 |
| 7,021,655 B2 * | 4/2006 | Saiguchi | B60N 2/4221 | 280/733 |
| 7,040,651 B2 * | 5/2006 | Bossecker | B60R 21/23138 | 280/729 |
| 7,134,684 B2 * | 11/2006 | Miyata | B60R 21/2338 | 280/730.1 |
| 7,150,468 B2 * | 12/2006 | Pan | B60R 21/207 | 280/730.1 |
| 7,207,594 B2 * | 4/2007 | Igawa | B60R 21/206 | 280/730.1 |
| 7,240,915 B2 * | 7/2007 | Peng | B60R 21/23138 | 280/730.2 |
| 7,258,188 B2 * | 8/2007 | Chernoff | B60R 21/18 | 180/268 |
| 7,380,818 B2 * | 6/2008 | Hofbeck | B60R 21/01534 | 280/735 |
| 7,445,284 B2 * | 11/2008 | Gerfast | B60N 2/4221 | 297/216.12 |
| 7,503,583 B2 * | 3/2009 | Muller | B60R 21/205 | 280/728.3 |
| 7,516,979 B2 * | 4/2009 | Kokeguchi | B60R 21/18 | 280/729 |
| 7,549,672 B2 * | 6/2009 | Sato | B60R 21/207 | 280/729 |
| 7,604,080 B2 * | 10/2009 | Breed | B60N 2/0232 | 180/274 |
| 7,699,265 B2 * | 4/2010 | Mastrolia | B64D 25/10 | 244/122 AG |
| 7,726,733 B2 * | 6/2010 | Balser | B60N 2/4279 | 297/216.1 |
| 7,770,921 B2 * | 8/2010 | Mueller | B60R 21/2346 | 280/739 |
| 7,878,452 B2 * | 2/2011 | Mastrolia | B64D 25/10 | 244/122 AG |
| 7,922,190 B2 * | 4/2011 | Sugimoto | B60R 21/207 | 280/729 |
| 7,922,191 B2 * | 4/2011 | Choi | B60R 21/233 | 280/729 |
| 7,926,839 B1 * | 4/2011 | Mothaffar | B60R 21/18 | 280/730.1 |
| 7,942,440 B2 * | 5/2011 | Choi | B60R 21/231 | 280/740 |
| 8,087,690 B2 * | 1/2012 | Kim | B60R 21/231 | 280/730.1 |
| 8,256,796 B2 * | 9/2012 | Loibl | B60R 21/207 | 280/730.2 |
| 8,282,126 B2 * | 10/2012 | Wiik | B60R 21/23138 | 280/730.2 |
| 8,360,469 B2 * | 1/2013 | Wiik | B60R 21/23138 | 280/743.2 |
| 8,393,636 B2 * | 3/2013 | Tanaka | B60R 21/2334 | 280/730.1 |
| 8,398,113 B2 * | 3/2013 | Choi | B60R 21/207 | 280/730.1 |
| 8,485,551 B2 * | 7/2013 | Dainese | B60R 21/207 | 280/730.2 |
| 8,579,321 B2 * | 11/2013 | Lee | B60R 21/233 | 280/729 |
| 8,684,408 B2 * | 4/2014 | Thomas | B60R 21/231 | 280/743.2 |
| 8,807,593 B2 * | 8/2014 | Lee | B60R 21/213 | 280/730.1 |
| 8,820,830 B2 * | 9/2014 | Lich | B60N 2/986 | 297/216.13 |
| 8,899,619 B2 * | 12/2014 | Fukawatase | B60R 21/207 | 280/749 |
| 8,985,622 B1 * | 3/2015 | Cannon | B60R 21/207 | 280/730.2 |
| 9,038,948 B2 * | 5/2015 | Ruff | B64D 25/10 | 244/122 AG |
| 9,156,426 B1 * | 10/2015 | Faruque | B60R 21/207 | |
| 9,233,630 B2 * | 1/2016 | Amirault | B60N 2/2866 | |
| 9,233,661 B2 * | 1/2016 | Yamanaka | B60R 21/207 | |
| 9,238,425 B2 * | 1/2016 | Fukawatase | B60R 21/013 | |
| 9,352,839 B2 * | 5/2016 | Gehret | B64D 11/06205 | |
| 9,376,083 B2 * | 6/2016 | Yamanaka | B60R 21/207 | |
| 9,428,138 B2 * | 8/2016 | Farooq | B60R 21/2338 | |
| 9,533,605 B2 * | 1/2017 | Fujiwara | B60R 21/239 | |
| 9,533,651 B1 * | 1/2017 | Ohno | B60R 21/0134 | |
| 9,566,882 B2 * | 2/2017 | Mihm | B60R 21/231 | |

(56) References Cited

U.S. PATENT DOCUMENTS

| | | | |
|---|---|---|---|
| 9,573,553 B2* | 2/2017 | Ko | B60R 21/207 |
| 9,598,042 B2* | 3/2017 | Schneider | B60R 21/231 |
| 9,663,061 B2* | 5/2017 | Mihm | B60R 21/23138 |
| 9,707,876 B2* | 7/2017 | White | B60N 2/6009 |
| 9,738,243 B2* | 8/2017 | Fukawatase | B60R 21/2338 |
| 9,744,932 B1* | 8/2017 | Faruque | B60R 21/16 |
| 9,758,127 B1* | 9/2017 | Farooq | B60R 22/14 |
| 9,783,155 B2* | 10/2017 | Kondo | B60R 22/48 |
| 9,796,351 B2* | 10/2017 | Fujiwara | B60R 21/207 |
| 9,827,876 B2* | 11/2017 | Madaras | B60N 2/0276 |
| 9,919,673 B2* | 3/2018 | Ohno | B60R 21/262 |
| 9,981,624 B2* | 5/2018 | Perlo | B60R 21/207 |
| 9,994,181 B1* | 6/2018 | Dubaisi | B60R 21/207 |
| 10,077,058 B2* | 9/2018 | Ohmi | G05D 1/0246 |
| 10,081,274 B2* | 9/2018 | Frank | B60N 2/2884 |
| 10,112,570 B2* | 10/2018 | Barbat | B60N 2/143 |
| 10,131,312 B2* | 11/2018 | Wiik | B60R 21/23138 |
| 10,189,431 B2* | 1/2019 | Yamamoto | B60R 21/207 |
| 10,189,432 B2* | 1/2019 | Matsushita | B60R 22/00 |
| 10,232,814 B2* | 3/2019 | Gandhi | B60N 2/914 |
| 10,232,816 B2* | 3/2019 | Fujiwara | B60R 21/01 |
| 10,246,043 B2* | 4/2019 | Schneider | B60R 21/207 |
| 10,252,688 B2* | 4/2019 | Szawarski | B60N 2/002 |
| 10,308,205 B2* | 6/2019 | Schneider | B60R 21/2338 |
| 10,328,889 B2* | 6/2019 | Sugie | B60R 21/233 |
| 10,336,278 B2* | 7/2019 | Schneider | B60R 21/207 |
| 10,343,638 B2* | 7/2019 | Fukawatase | B60R 21/233 |
| 10,471,919 B2* | 11/2019 | Faruque | B60R 21/205 |
| 10,471,920 B2* | 11/2019 | Dry | B60R 21/233 |
| 10,513,206 B2* | 12/2019 | Spahn | B60N 2/4207 |
| 10,518,733 B2* | 12/2019 | Dry | B60R 21/207 |
| 10,596,993 B2* | 3/2020 | Dry | B60R 21/23138 |
| 10,625,704 B2* | 4/2020 | Dry | B60R 21/233 |
| 10,632,952 B2* | 4/2020 | Markusic | B60R 21/231 |
| 10,632,958 B2* | 4/2020 | Dry | B60N 2/767 |
| 10,633,100 B2* | 4/2020 | Adams | B64D 25/10 |
| 10,703,322 B2* | 7/2020 | Kitagawa | B60R 21/2338 |
| 2002/0140214 A1* | 10/2002 | Breed | E05F 15/43 280/735 |
| 2004/0245813 A1* | 12/2004 | Steffens, Jr. | B60N 2/42781 297/216.1 |
| 2006/0038386 A1* | 2/2006 | Shibayama | B60R 21/23138 280/730.2 |
| 2006/0119083 A1* | 6/2006 | Peng | B60R 21/207 280/730.2 |
| 2006/0214401 A1* | 9/2006 | Hirata | B60R 21/232 280/730.1 |
| 2006/0289220 A1* | 12/2006 | Oota | B60R 21/207 180/274 |
| 2007/0040368 A1* | 2/2007 | Manley | D03D 25/005 280/743.2 |
| 2007/0228709 A1* | 10/2007 | Khouri | B60R 21/233 280/740 |
| 2010/0213748 A1* | 8/2010 | Pedrero Iniguez | B60N 2/865 297/410 |
| 2010/0237596 A1* | 9/2010 | Sugimoto | B60R 21/26 280/743.1 |
| 2012/0007408 A1* | 1/2012 | Freienstein | B60N 2/4235 297/464 |
| 2012/0086250 A1* | 4/2012 | Stoessel | B60N 2/986 297/284.9 |
| 2012/0089303 A1* | 4/2012 | Freienstein | B60N 2/4235 701/45 |
| 2013/0015642 A1* | 1/2013 | Islam | B60R 21/231 280/730.1 |
| 2013/0093224 A1* | 4/2013 | Dainese | B60R 21/207 297/216.12 |
| 2014/0042733 A1* | 2/2014 | Fukawatase | B60R 21/0136 280/730.2 |
| 2014/0300088 A1* | 10/2014 | Fukawatase | B60R 21/08 280/729 |
| 2014/0327234 A1* | 11/2014 | Heurlin | B60N 2/2872 280/730.1 |
| 2015/0336493 A1* | 11/2015 | Watanabe | B60N 2/688 297/354.12 |
| 2016/0082915 A1* | 3/2016 | Madaras | B60R 21/231 297/216.2 |
| 2016/0121839 A1* | 5/2016 | Ko | B60R 21/233 280/730.1 |
| 2016/0272141 A1* | 9/2016 | Ohmura | B60R 21/0134 |
| 2016/0347272 A1* | 12/2016 | Kato | B60R 21/207 |
| 2017/0028955 A1* | 2/2017 | Ohno | B60R 21/207 |
| 2017/0057456 A1* | 3/2017 | Ohno | B60R 21/23138 |
| 2017/0057459 A1* | 3/2017 | Kondo | B60R 21/207 |
| 2017/0144622 A1* | 5/2017 | Perlo | B60R 21/233 |
| 2017/0203711 A1* | 7/2017 | Ohno | B60R 21/237 |
| 2017/0259704 A1* | 9/2017 | Madaras | B60R 21/04 |
| 2017/0259774 A1* | 9/2017 | Matsushita | B60R 21/23138 |
| 2017/0291569 A1* | 10/2017 | Sugie | B60R 21/2338 |
| 2018/0222432 A1* | 8/2018 | Schneider | B60R 21/261 |
| 2019/0016293 A1* | 1/2019 | Saso | B60R 21/207 |
| 2019/0031132 A1* | 1/2019 | Dry | B60R 21/207 |
| 2019/0054884 A1* | 2/2019 | Dry | B60R 21/2338 |
| 2019/0071046 A1* | 3/2019 | Dry | B60R 21/207 |
| 2019/0217803 A1* | 7/2019 | Dry | B60R 21/23138 |
| 2019/0217805 A1* | 7/2019 | Dry | B60N 2/14 |
| 2019/0248322 A1* | 8/2019 | Herzenstiel | B60R 21/207 |
| 2019/0291678 A1* | 9/2019 | Oho | B60R 21/231 |

* cited by examiner

A-A

OCCUPANT RESTRAINT DEVICE

CROSS-REFERENCE TO RELATED APPLICATION

This application claims priority to Japanese Patent Application No. 2018-024146 filed 14 Feb. 2018 which is hereby expressly incorporated by reference herein in its entirety.

BACKGROUND

Technical Field

The present invention relates to an occupant restraint device that restrains an occupant sitting in a vehicle seat.

Background Art

In the recent years, an airbag device has become standard equipment for most motor vehicles. The airbag device is a safety device that is activated upon an emergency event such as a vehicle collision, and receives and protects an occupant by the expansion and deployment by a gas pressure. There are various kinds of airbag devices according to installation locations and uses. For instance, in an occupant restraint device described in International Patent Application Publication Number WO 2016/039160, a side airbag that is expanded and deployed directly adjacent to a side of an occupant is provided at each side of a vehicle seat.

In particular, in the occupant restraint device described in International Patent Application Publication Number WO 2016/039160, a tension cloth (tension fabric) is provided at an airbag. Specifically, when tension is given to the tension cloth at the time of the expansion and deployment of the airbag, the tension cloth extends between the airbags and both side surfaces of a seat cushion. As a result, a movement of the airbag can be regulated by the tension cloth. Therefore, it becomes possible to improve an occupant restraint performance by the airbag.

SUMMARY

In the occupant restraint device described in International Patent Application Publication Number WO 2016/039160 described above and also in an occupant restraint device in which side airbags are provided at both sides of a vehicle seat, an internal pressure different between two airbags may be generated. Specifically, for instance, when a collision direction is oblique, an internal pressure of one of the airbags that is positioned in the direction in which an occupant is forced to move (an occupant enters) is increased as compared with an internal pressure of the other of the airbags. As a result, an internal pressure difference being generated between the two airbags becomes excessive and a difference of an occupant restraint performance may occur.

The present invention attempts to solve the above problems. An object of the present invention is to provide an occupant restraint device that can decrease an internal pressure difference between two airbags provided at both sides of an occupant at the time of an offset collision and an oblique collision so that the occupant can be surely restrained with a better (internal pressure) balance (in the well-balanced manner).

In order to achieve the above object, an occupant restraint device according to one aspect of the present invention includes right and left airbags, right and left tension cloths, and a lower tension cloth. The right and left airbags are stored inside right and left sides of a seat back of a vehicle seat, respectively. The right and left airbags are expanded and deployed on right and left sides of an occupant sitting in the vehicle seat, respectively. The right and left tension cloths connected to outer surfaces of the right and left airbags, respectively. The lower tension cloth is disposed inside a seat cushion of the vehicle seat. The lower tension cloth is continuously connected between a lower part of the right tension cloth and a lower part of the left tension cloth. The lower tension cloth is movable in right and left directions with respect to the occupant sitting in the vehicle seat. When the right and left airbags are expanded and deployed, the right tension cloth, the left tension cloth, and the lower tension cloth are configured to push the expanded and deployed right and left airbags toward the occupant.

In the above configuration according to one aspect of the present invention, because the lower tension cloth is movable in the right and left direction (crosswise direction) in the seat cushion when the airbags are expanded and deployed, it becomes possible that the right and left tension cloths that are connected to the lower tension cloth are also movable in the crosswise direction. Thus, when the occupant enters into (the occupant is forced to move toward) one of the pair of airbags at the time of an oblique collision, the other of the pair of airbags is pressed and pushed in a direction toward the occupant by a slide movement of the tension cloths. As a result, because the other of the pair of airbags moves in the direction toward the occupant, an internal pressure difference between the pair of airbags can be decreased and the occupant can be restrained with a better (internal pressure) balance (in the well-balanced manner).

Further, according to one aspect of the present invention, the right and left tension cloths may be configured with a plurality of right and left tension cloths, respectively. Thus, because the movement of the pair of airbags can be suitably regulated by the plurality of right and left tension cloths, an occupant restraint performance is further improved.

Further, according to one aspect of the present invention, one of the plurality of right tension cloths may be paired with corresponding one of the plurality of left tension cloths. The lower tension cloth can be continuously connected between the lower parts of the paired right and left tension cloths. As a result, because the plurality of right and left tension cloths are provided, the pair of airbags can be held with a good balance (in the well-balanced manner).

Further, according to one aspect of the present invention, the paired right and left tension cloths is configured with a plurality of the paired right and left tension cloths including first and second paired right and left tension cloths. The first paired right and left tension cloths alternate with the second paired right and left tension cloths on the right and left airbags in a vehicle travel direction. Even in the above configuration according to one aspect of the present invention, the same effect as explained above can be obtained.

The occupant restraint device according to one aspect of the present invention further includes a reinforcement pipe disposed inside the seat cushion. The reinforcement pipe extends along a vehicle width direction. The lower tension cloth passes through an inside of the reinforcement pipe. Thus, the lower tension cloth slides and moves inside the reinforcement pipe when the airbags are expanded and deployed. As a result, because the lower tension cloth can more smoothly move, the effect explained above can be enhanced.

Further, according to one aspect of the present invention, a cross-sectional shape of the reinforcement pipe is preferably flat-shaped. As a result, the torsion, kink, and twist of the tension cloth located inside the reinforcement pipe can be suitably prevented.

The occupant restraint device according to one aspect of the present invention further includes right and left guide members disposed in right and left sides of the seat cushion, respectively. Each of the right and left guide members has an opening. The lower tension cloth is inserted into the openings of the right and left guide members. According to the above configuration, when the airbags are expanded and deployed, the lower tension cloth and the left and right tension cloths being connected to the lower tension cloth, which may pass through the openings of the guide members, can slide and move inside and outside the seat cushion. Therefore, because the lower tension cloth can more smoothly move, the effect explained above can be enhanced.

According to one aspect of the present invention, it is possible to provide an occupant restraint device that decreases an internal pressure difference between two airbags located at both side of an occupant at the time of an oblique collision and that restrains an occupant with a better balance (in the well-balanced manner).

DESCRIPTION OF EXEMPLARY EMBODIMENTS

Figure 1:
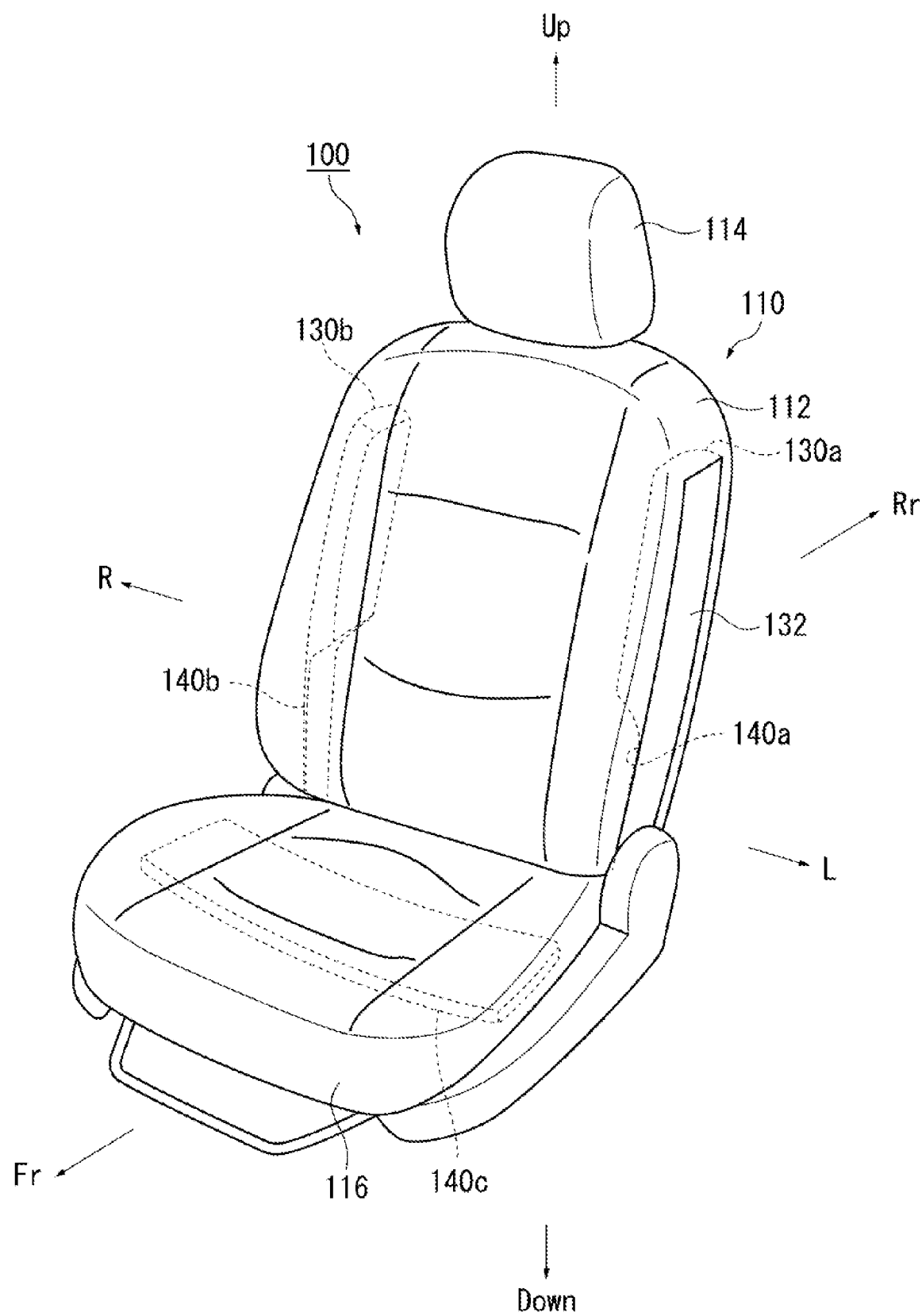
FIG. 1 is a schematic view that shows an occupant restraint device according to a first embodiment of the present invention.

Preferred embodiments of the present invention will be explained in detail with reference to the attached drawings below. The dimensions, materials, other concrete numerical values, and others that are disclosed in the embodiments are merely examples for facilitating understanding of the invention. Thus, unless otherwise stated, they are not limited the scope of the present invention. Further, in the specification and the drawings, with respect to the elements having substantially the same functions and configurations, redundant explanations are omitted by accompanying the same reference numerals. Further, the elements that are not directly related to the present invention are not shown in the drawings.

Further, in the embodiments of the present invention, when an occupant sits in a vehicle seat in a normal sitting attitude, a direction to which the occupant faces is referred to as "front (forward)" and its opposite direction is referred to as "rear (backward)." Further, when the occupant sits in the vehicle seat in the normal sitting attitude, a right side of the occupant is referred to as "right direction" and a left side of the occupant is referred to as "left direction." Further, when the occupant sits in the vehicle seat in the normal sitting attitude, a direction above a head of the occupant is referred to as "up (upward)" and a direction below a waist of the occupant is referred to as "down (downward)." Regarding to the drawings that are used for the explanations below, the front/rear, left/right, and up/down directions with respect to the occupant respectively denote Fr, Rr, L, R, Up, and Down as necessary.

First Embodiment

Figure 2A:
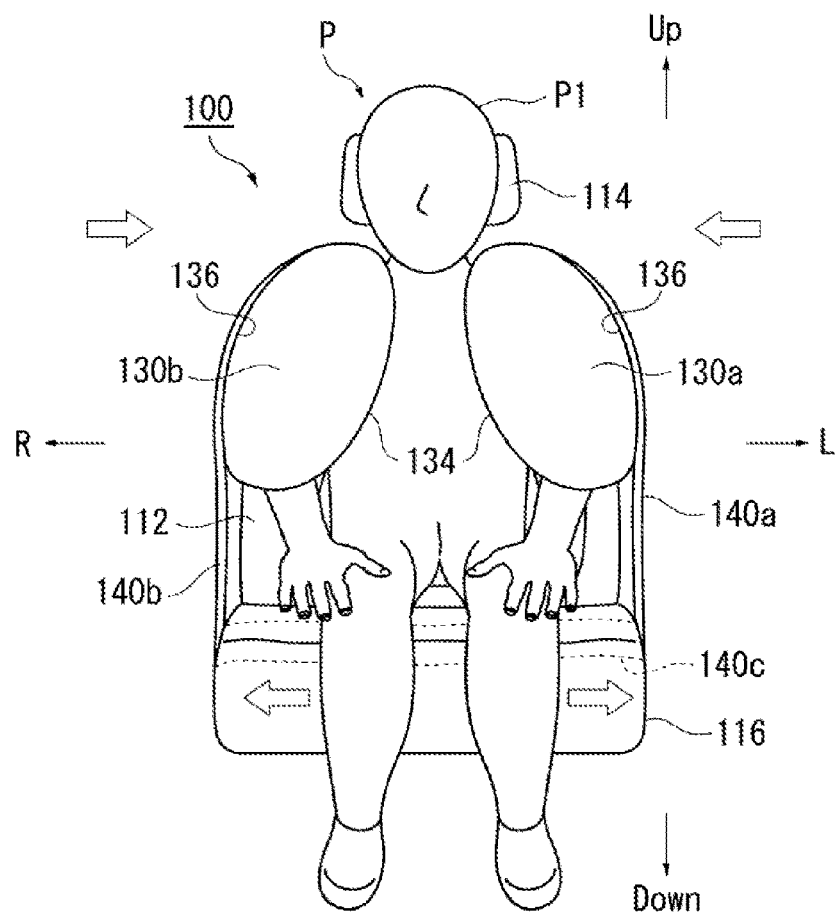
FIGS. 2A and 2B are schematic views that show states in which an occupant sits in a vehicle seat shown in FIG. 1.
Figure 2B:
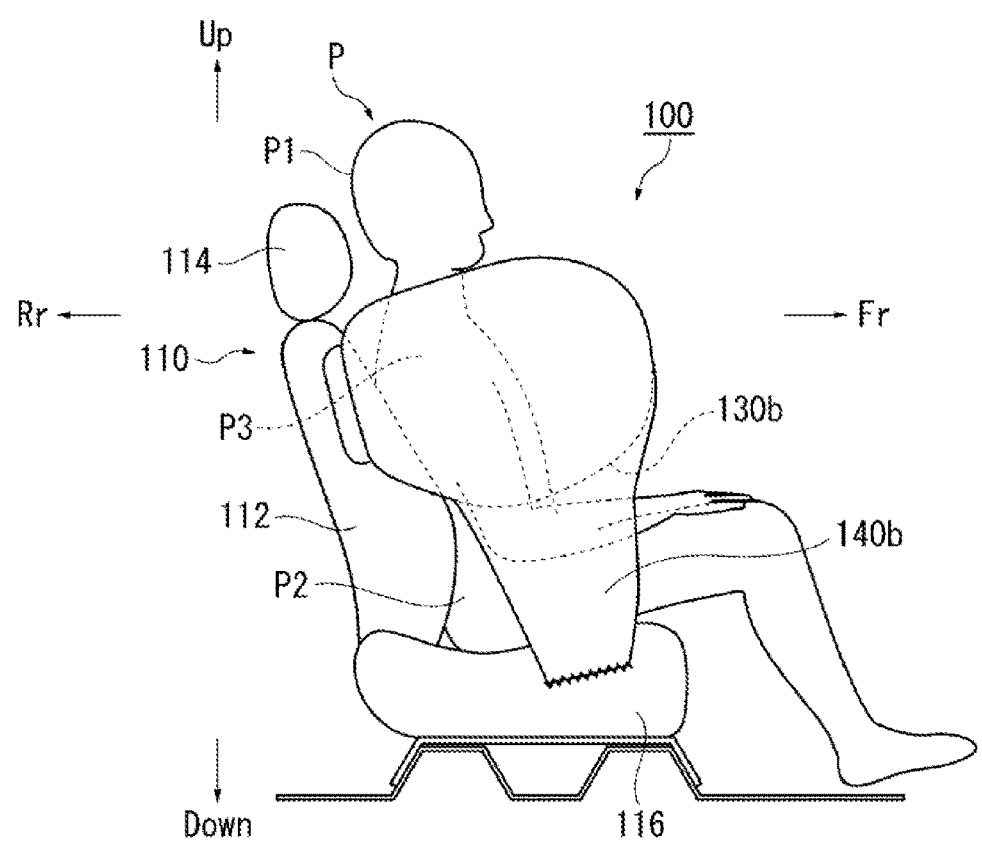

FIG. 1 is a schematic view that shows an occupant restraint device 100 according to a first embodiment of the present invention. FIGS. 2A and 2B are schematic views that show states in which an occupant P sits in a vehicle seat (seat) 110 shown in FIG. 1. FIG. 2A shows a state in which the seat 110 shown in FIG. 1 is observed from a front side of a vehicle. FIG. 2B shows a state in which the seat 110 shown in FIG. 1 is observed from a right side of the vehicle.

Further, to easily comprehend the embodiment according to the present invention, in FIG. 1, members that are stored (housed) inside the seat 110 are shown by a broken line. FIG. 1 shows a state in which (left and right) airbags 130a and 130b are not expanded and deployed so that they are in a housed state. On the other hand, FIG. 2 shows a state in which the airbags 130a and 130b are expanded and deployed.

The occupant restraint device 100 according to the first embodiment restrains the occupant P being seated on the seat 110 (refer to FIG. 2) of the vehicle (the entirety of the vehicle is not shown). The seat 110 has a seat back 112 that supports a bust (the upper half of the body) P2 of the occupant P. A headrest 114 that supports a head P1 of the occupant P is positioned in the upward of the seat back 112. A seat cushion 116 on which the occupant P is seated in the downward of the seat back 112.

As shown in FIG. 1, the occupant restraint device 100 according to the first embodiment has the airbags 130a and 130b, a left tension cloth 140a, a right tension cloth 140b, and a lower tension cloth 140c. A pair of the airbags 130a and 130b (side airbags) are stored inside left and right sides of the seat back 112 of the seat 110, respectively, and are covered by a cover 132. As shown in FIGS. 2A and 2B, the airbags 130a and 130b are respectively expanded and deployed toward the left and right sides of the occupant P at the time of an oblique collision and restrain the shoulders P3 of the occupant P. As a result, the movement of the bust (the upper half of the body) P2 of the occupant P in a longitudinal direction (a vehicle travel direction) and in a crosswise direction (right and left directions of a vehicle width direction) is regulated.

The left tension cloth 140a, the right tension cloth 140b, and the lower tension cloth 140c are cloth members. The pair of airbags 130a and 130b respectively has an inner surface 134 and an outer surface 136. Specifically, at the time of the expansion and the deployment, the inner surface 134 corresponds to a surface side that contacts with the occupant P. The outer surface 136 corresponds to an opposite surface of the inner surface 134, i.e., a surface side that does not contact with the occupant P. The left tension cloth 140a and the right tension cloth 140b are connected to the outer surfaces of the pair of airbags 130a and 130b, respectively.

A pair of the left tension cloth 140a and the right tension cloth 140b passes on the opposite sides of the occupant P with respect to the pair of airbags 130a and 130b being stored, and extends over the inside of the seat cushion 116 from the inside of the seat back 112 of the seat 110 so as to be stored inside the seat 110. On the other hand, the lower tension cloth 140c is stored inside the seat cushion 116 of the seat 110. Further, the lower parts of the pair of left tension cloth 140a and right tension cloth 140b are continuously connected to both ends of the lower tension cloth 140c inside the seat cushion 116.

When the airbags 130a and 130b are expanded and deployed, the pair of left tension cloth 140a and right tension cloth 140b cleaves the side surfaces of the seat cushion 116. Thus, as shown in FIGS. 2A and 2B, the left tension cloth 140a and the right tension cloth 140b respectively expand (extend) because the tension is given between the airbags 130a and 130b and both side surfaces of the seat cushion 116.

At this time, as a feature of the present embodiment, as shown in the arrows in FIG. 2A, the lower tension cloth 140c is movably positioned in the crosswise direction in the inside of the seat cushion 116. As a result, when the lower tension cloth 140c moves in a left direction at the time of the expansion and the deployment of the airbags 130a and 130b, not only the right tension cloth 140b but also the (right) airbag 130b to which the right tension cloth 140b is connected are energized (pressed and pushed) toward the occupant P. On the other hand, when the lower tension cloth 140c moves in a right direction, not only the left tension cloth 140a but also the (left) airbag 130a to which the left tension cloth 140a is connected are energized (pressed and pushed) toward the occupant P.

As explained above, with respect to the occupant restraint device 100 according to the first embodiment, when the airbags 130a and 130b are expanded and deployed, the lower tension cloth 140c moves in the crosswise direction in the inside of the seat cushion 116. As a result, it becomes possible that the left tension cloth 140a and the right tension cloth 140b that are connected to the lower tension cloth 140c also move in the crosswise direction. Therefore, the pair of airbags 130a and 130b that are expanded and deployed are pressed and pushed in the direction toward the occupant P from the outer surfaces 136 of the airbags 130a and 130b by the left tension cloth 140a, the right tension cloth 140b, and the lower tension cloth 140c.

According to the configuration explained above, when the occupant P enters into (is forced to move toward) one of the pair of airbags 130a and 130b at the time of an oblique collision, the other of the pair of airbags 130a and 130b is pressed and pushed in the direction toward the occupant P by the slide movement (sliding and moving) of the left tension cloth 140a, the right tension cloth 140b, and the lower tension cloth 140c. As a result, because the other of the pair of airbags 130a and 130b moves so as to approach the occupant P, it becomes possible that the internal pressure difference between the two airbags 130a and 130b is decreased and the occupant is restrained in the well-balanced manner.

Second Embodiment

Figure 3A:
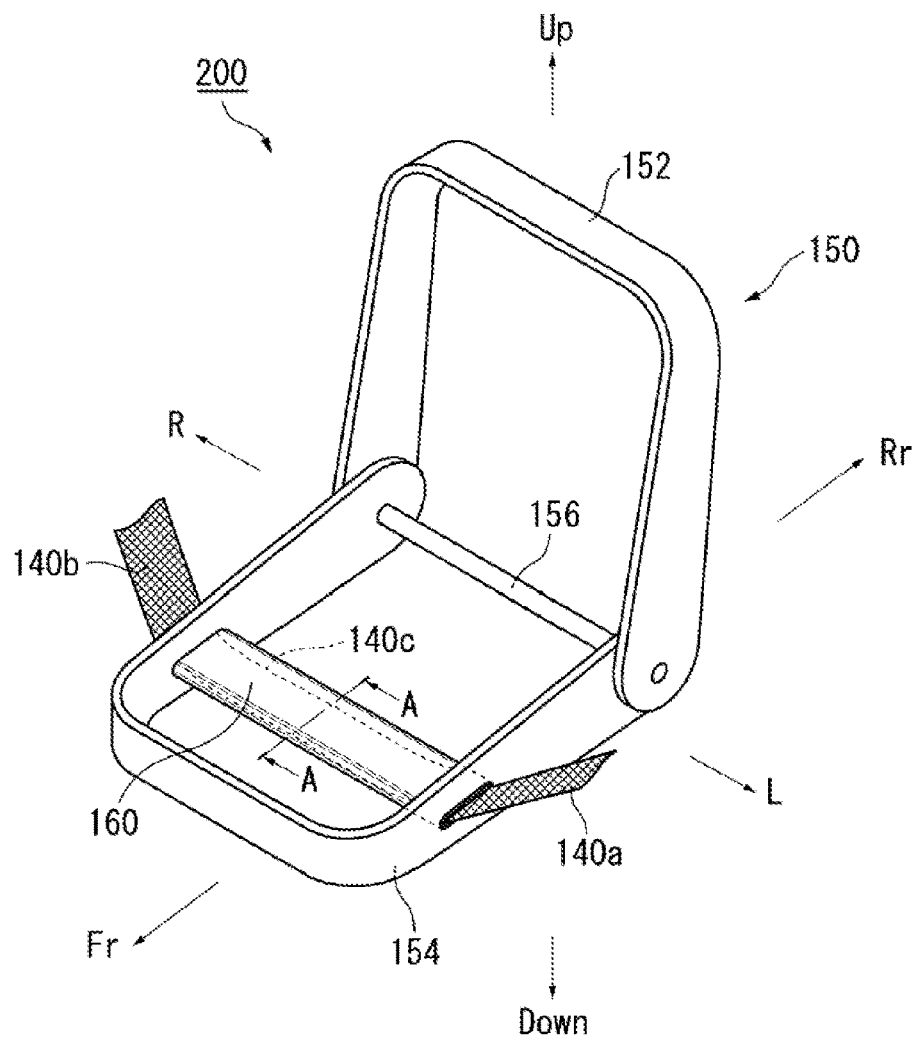
FIGS. 3A and 3B are schematic views for explaining an occupant restraint device according to a second embodiment of the present invention.
Figure 3B:
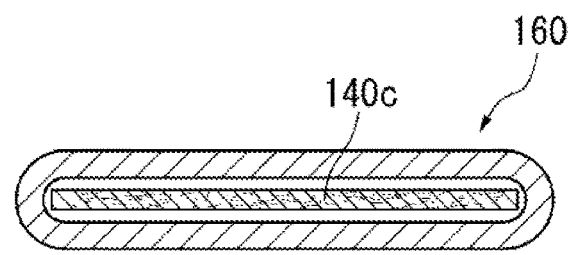

FIGS. 3A and 3B are schematic views for explaining an occupant restraint device 200 according to a second embodiment of the present invention. In particular, in FIGS. 3A and 3B, an illustration of the entirety of the seat 110 (refer to FIGS. 1 and 2A-2B) is omitted. Instead, a seat frame 150 that is disposed inside the seat 110 is shown. FIG. 3A is the schematic view that shows the entirety of the seat frame 150. FIG. 3B is a cross-sectional view along the A-A line shown in FIG. 3A. As shown in FIG. 3A, the seat frame 150 as a framework is disposed inside the seat 110.

As shown in FIG. 3A, the seat frame 150 has an upper frame 152 and a lower frame 154. Specifically, the upper frame 152 is disposed inside the seat back 112. The lower frame 154 is disposed inside the seat cushion 116. The upper frame 152 and the lower frame 154 are connected by a connection pipe 156.

Further, as shown in FIG. 3A, a reinforcement pipe 160 that extends in the vehicle width direction is disposed inside the seat cushion 116. As a feature of the occupant restraint device 200 according to the second embodiment, the lower tension cloth 140c passes through the inside of the reinforcement pipe 160 as shown in FIG. 3B. The pair of the left tension cloth 140a and the right tension cloth 140b explained above are connected to the lower tension cloth 140c that passes through the inside of the reinforcement pipe 160. Such the connection between the lower tension cloth 140c and the pair of the left tension cloth 140a and the right tension cloth 140b is performed inside the reinforcement pipe 160 in the present embodiment. However, it is also possible to be performed outside the reinforcement pipe 160.

With respect to the above configuration according to the second embodiment, when the airbags 130a and 130b are expanded and deployed, the lower tension cloth 140c can slide and move inside the reinforcement pipe 160. As a result, the lower tension cloth 140c becomes possible to more smoothly move. Therefore, the internal pressure difference being generated between the airbags 130a and 130b at the both sides of the occupant P at the time of the oblique collision can be more effectively eliminated.

Further, in the present embodiment, as shown in FIG. 3B, the reinforcement pipe 160 in which a cross-sectional shape is flat is adopted. In other words, the reinforcement pipe 160 is flat-shaped in a cross-sectional view. As a result, the torsion, kink, and twist of the left tension cloth 140a and the right tension cloth 140b in the reinforcement pipe 160 can be suitably prevented. Further, the effects explained above can be securely obtained. However, the cross-sectional shape of the reinforcement pipe 160 shown in FIG. 3B is just an example and is not limited to this configuration. In addition to the flat shape shown in FIG. 3B, the cross-sectional shape of the reinforcement pipe 160 can also be in a circular shape or in an elliptical or oval shape.

Third Embodiment

Figure 4A:
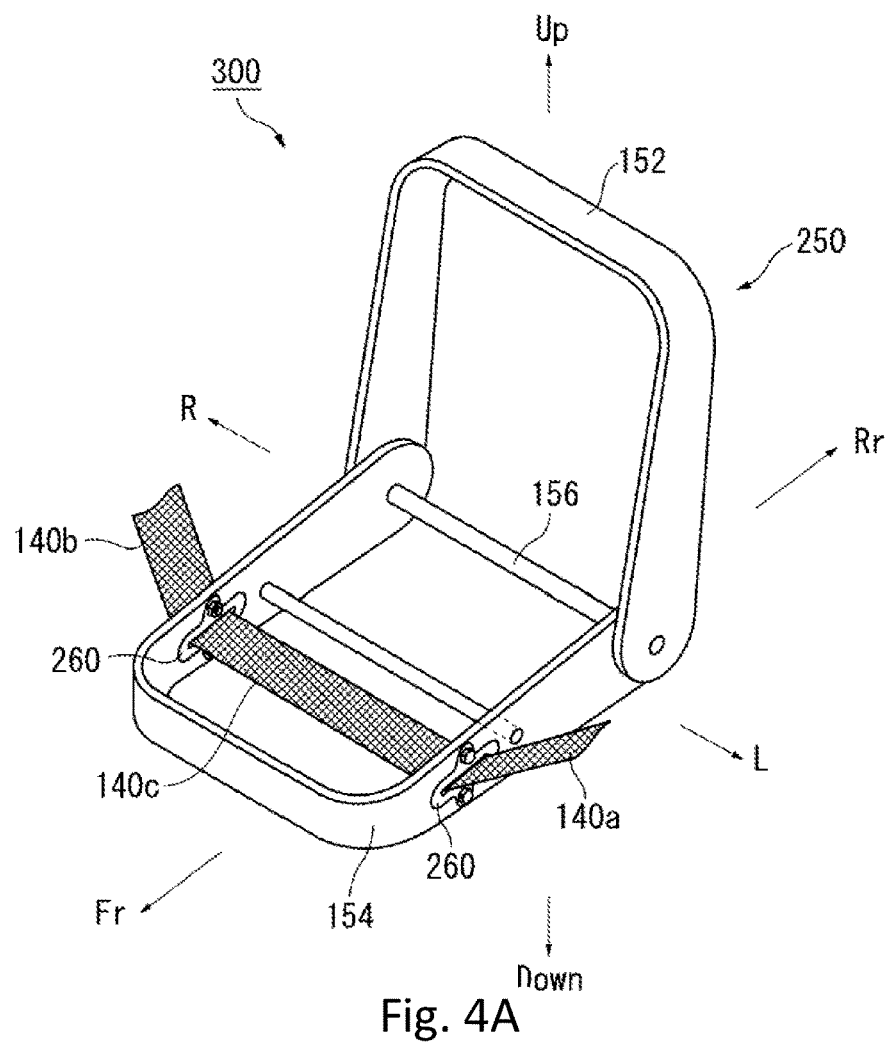
FIGS. 4A and 4B are schematic views for explaining an occupant restraint device according to a third embodiment of the present invention.
Figure 4B:
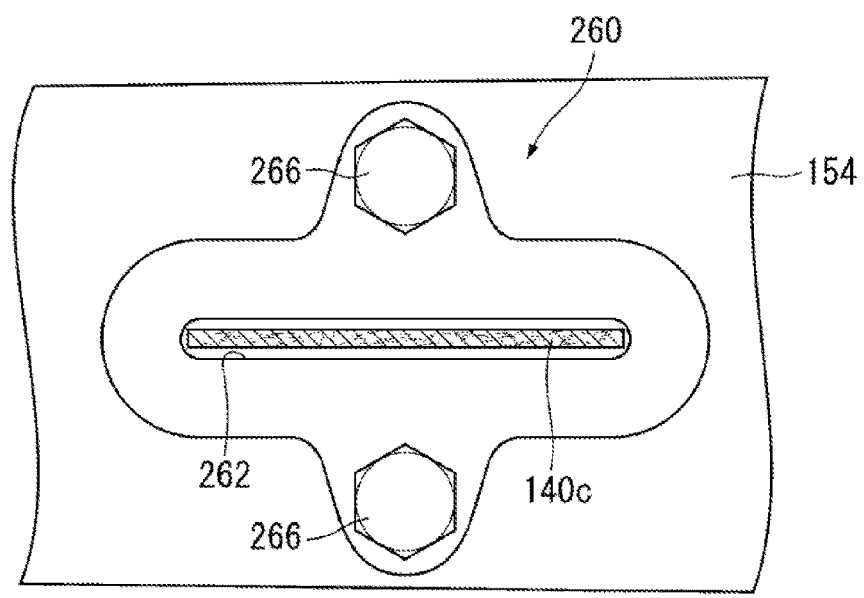

FIGS. 4A and 4B are schematic views for explaining an occupant restraint device 300 according to a third embodiment of the present invention. FIG. 4A is the schematic view that shows the entirety of a seat frame 250 that is disposed inside the seat 110. FIG. 4B is an enlarged side view of part of a side surface of a lower frame 154 shown in FIG. 4A. The redundant explanations with respect to the substantially same configurations as the occupant restraint device 100 according to the first embodiment and the occupant restraint device 200 according to the second embodiment are omitted, but the same reference numerals are used for labeling below.

In the occupant restraint device 300 according to the third embodiment of the present invention shown in FIG. 4A, guide members 260 are provided in the seat frame 250 instead of the reinforcement pipe 160 in the seat frame 150 according to the second embodiment. As shown in FIG. 4B, the guide member 260 has an insertion hole 262 into which the lower tension cloth 140c is inserted. Further, the guide member 260 is fixed to the side surface of the lower frame 154 by bolts 266. Thus, the guide member 260 is provided on each of the right and left side surfaces of the lower frame 154. As a result, the two guide members 260 are disposed at the right and left side surfaces of the seat cushion 116 (refer to FIG. 1) of the seat 110.

With respect to the above configuration according to the third embodiment, the lower tension cloth 140c is inserted into the insertion holes 262 of the guide members 260. As a result, when the airbags 130a and 130b are expanded and deployed, the lower tension cloth 140c, and the left tension cloth 140a and the right tension cloth 140b that are connected to the lower tension cloth 140c can slide and move inside the seat cushion 116 by passing through the insertion holes 262 of the guide members 260. Therefore, the occupant restraint device 300 according to the third embodiment can obtain the above same effects as the occupant restraint device 200 according to the second embodiment.

Further, treatment for reducing friction resistance such as fluororesin coating (a low-friction coefficient coating) may be applied to the areas in which the left tension cloth 140a, the right tension cloth 140b, and the lower tension cloth 140c explained above contact with the reinforcement pipe 160 (the second embodiment) or the guide members 260 with the insertion holes 262 (the third embodiment). As a result, because friction coefficients of these tension cloths 140a, 140b, and 140c can be adjusted, a slide amount of these tension cloths 140a, 140b, and 140c can be adjusted.

Further, with respect to the occupant restraint devices 100, 200, and 300 according to the first, second, and third embodiments explained above, a threshold load can be implemented. The threshold load controls a timing in which the left tension cloth 140a, the right tension cloth 140b, and the lower tension cloth 140c start to slide. As one of the exemplarily methods for setting the threshold load, a part of any of the above tension cloths 140a, 140b, and 140c is sewn and fixed on a seat cover of the seat cushion 16 or a cushion material (not shown) provided inside the seat cushion 16.

With respect to the configuration explained above, when a predetermined load (the threshold load) is applied to a sewing thread for sewing, the sewing thread is cut (broken). As a result, since the fixed (sewn) part between the seat cushion 116 and the above part of the tension cloths 140a, 140b, and 140c is released, the tension cloths 140a, 140b, and 140c can slide and move. Therefore, the slide movement of the tension cloths 140a, 140b, and 140c can be started at a desired timing.

Fourth Embodiment

Figure 5A:
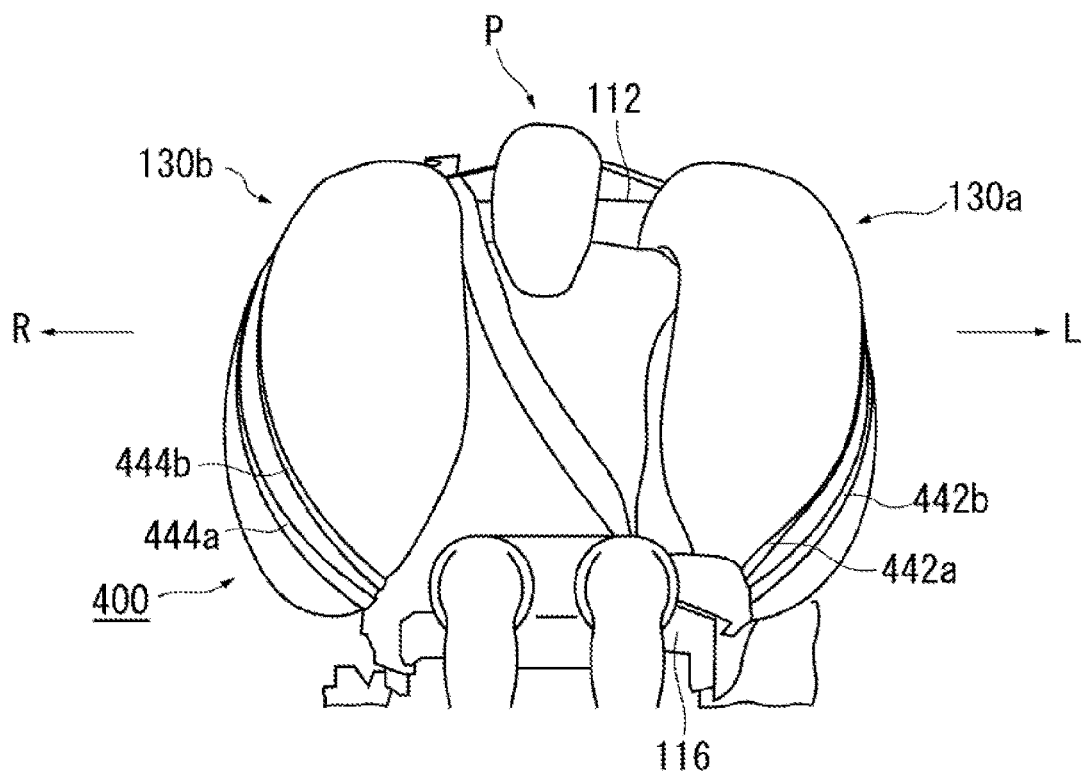
FIGS. 5A and 5B are schematic views for explaining an occupant restraint device according to a fourth embodiment of the present invention.
Figure 5B:
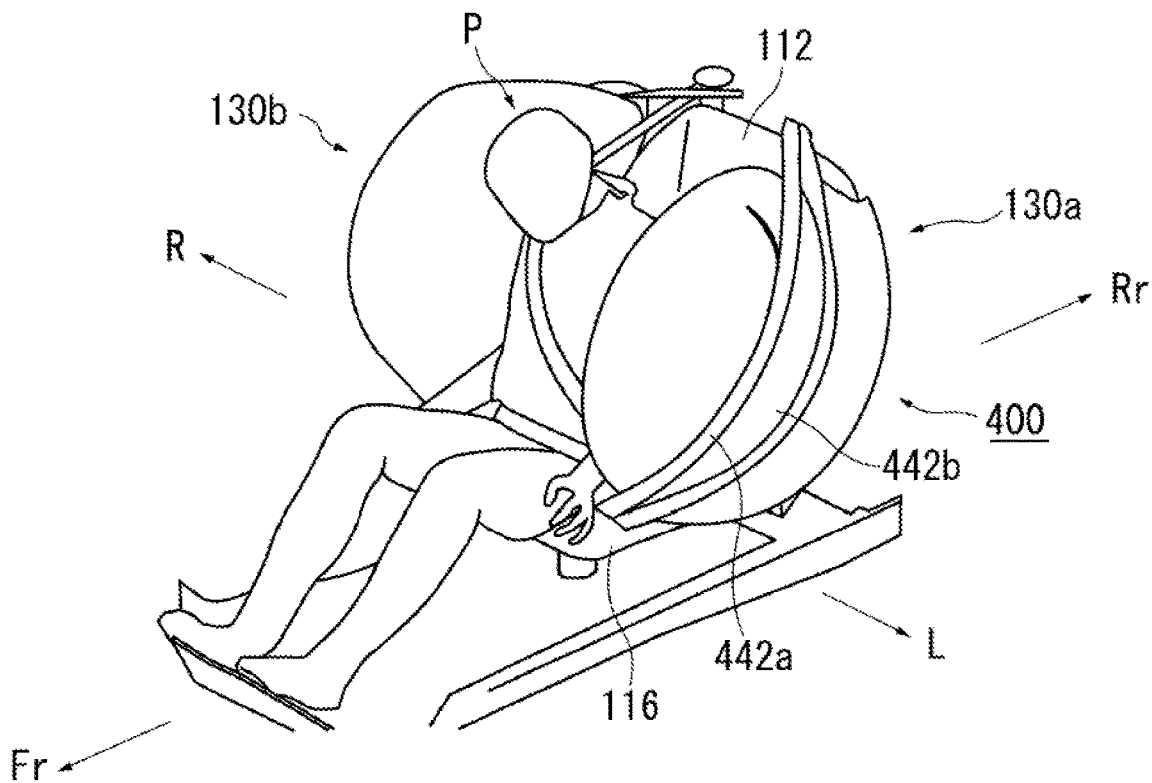

FIGS. 5A and 5B are schematic views for explaining an occupant restraint device 400 according to a fourth embodiment of the present invention. FIG. 5A is the schematic view that shows a state in which an occupant P being seated on the seat 110 shown in FIG. 1 is observed from a front side of a vehicle. FIG. 5B is the schematic view that shows a state in which the occupant P being seated on the seat 110 shown in FIG. 1 is observed from a slanting front side of the vehicle.

As shown in FIGS. 5A and 5B, each of the left tension cloth and the right tension cloth has a plurality of tension cloths in the occupant restraint device 400 according to the fourth embodiment. Specifically, the occupant restraint device 400 has two left tension cloths including a first left tension cloth 442a and a second left tension cloth 442b and has two right tension cloths of a first right tension cloth 444a and a second right tension cloth 444b. These tension cloths 442s, 442b, 444a, and 444b are positioned so as to respectively extend on or above the outer surfaces 136 (refer to FIGS. 2A and 2B) of the airbags 130a and 130b. Thus, the movement in the crosswise direction of the airbags 130a and 130b can be more suitably regulated. As a result, an occupant restraint performance can be further enhanced.

Figure 6A:
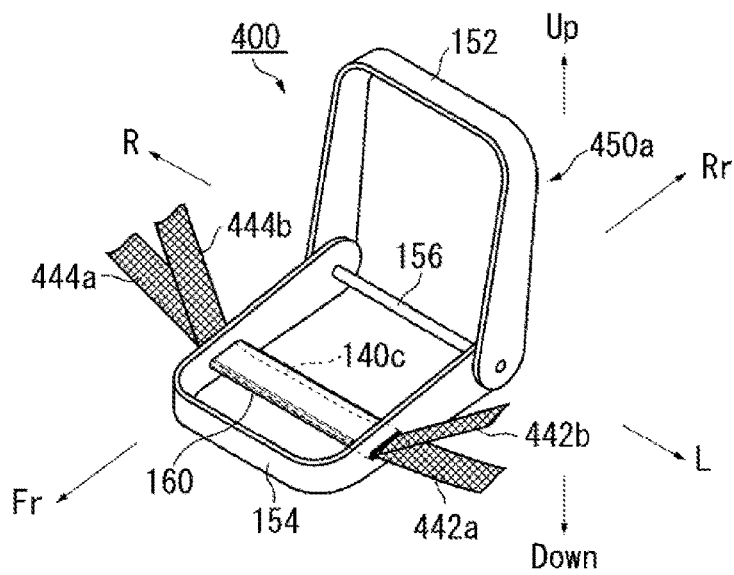
FIGS. 6A, 6B, and 6C are schematic views for explaining variations of tension cloths provided in the occupant restraint device according to the fourth embodiment of the present invention.
Figure 6B:
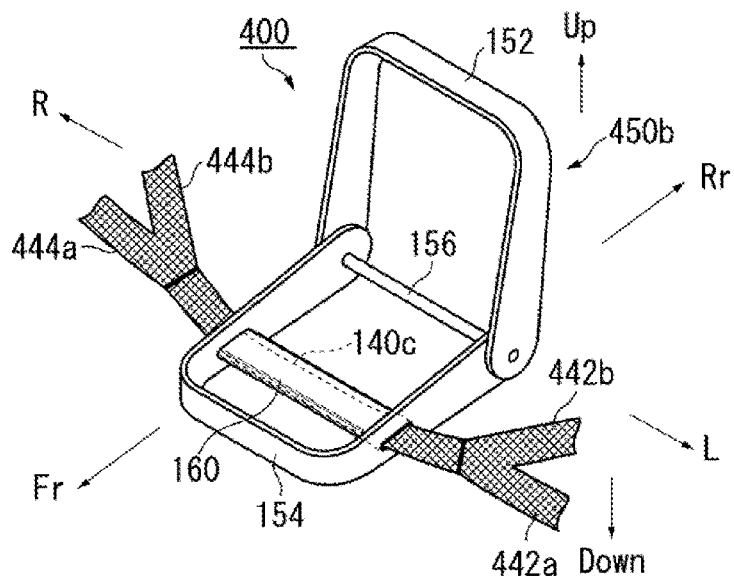
Figure 6C:
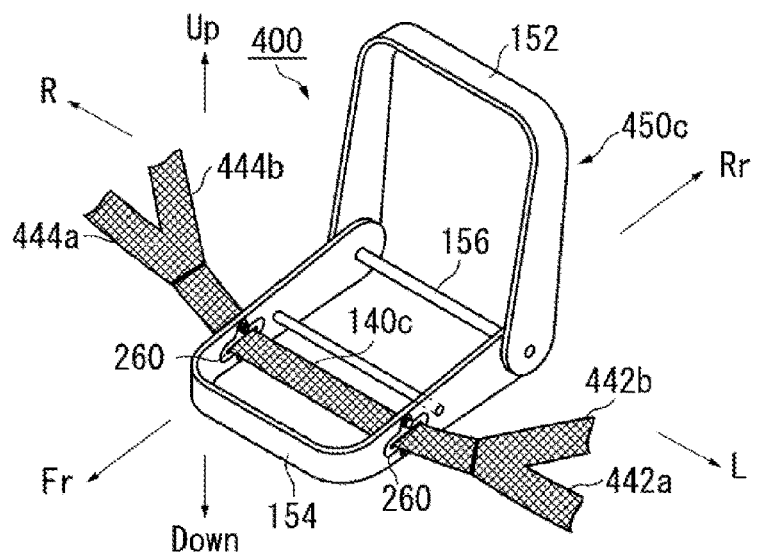

FIGS. 6A, 6B, and 6C are schematic views for explaining variations of tension cloths 140 (140c, 442a, 442b, 444a, and 444b) provided in the occupant restraint device 400 according to the fourth embodiment. FIGS. 6A, 6B, and 6C show the seat frame (150 or 250) that is disposed inside the seat 110 (refer to FIG. 1) shown in FIGS. 3A and 4A.

A seat frame 450a shown in FIG. 6A has the reinforcement pipe 160 of the occupant restraint device 200 according to the second embodiment. The lower tension cloth 140c passes through the inside of the reinforcement pipe 160. The lower parts of the first left tension cloth 442a, the second left tension cloth 442b, the first right tension cloth 444a, and the second right tension cloth 444b are connected to the lower tension cloth 140c within the reinforcement pipe 160. As a result, the first left tension cloth 442a, the second left tension cloth 442b, the first right tension cloth 444a, and the second right tension cloth 444b becomes in a continuous state via the lower tension cloth 140c.

With respect to a seat frame 450b shown in FIG. 6B, the lower tension cloth 140c is disposed in a state in which the tension cloth 140c passes through the reinforcement pipe 160 and extends to the outside of the lower frame 154. In the configuration explained above, the lower parts of the first left tension cloth 442a, the second left tension cloth 442b, the first right tension cloth 444a, and the second right tension cloth 444b are connected to the lower tension cloth 140c at the external side of the reinforcement pipe 160 (and the external side of the lower frame 154).

A seat frame 450c shown in FIG. 6C has the guide members 260 of the occupant restraint device 300 according to the third embodiment instead of the reinforcement pipe 160 of the seat frames 450a and 450b. The lower tension cloth 140c is disposed in a state in which the lower tension cloth 140c passes through (the insertion holes 262 (refer to FIG. 4B) of) the guide members 260 and extends to the outside of the lower frame 154. The lower parts of the first left tension cloth 442a, the second left tension cloth 442b, the first right tension cloth 444a, and the second right tension cloth 444b are connected to the lower tension cloth 140c at the external side of the lower frame 154.

Further, in the present embodiment, the first left tension cloth 442a and the first right tension cloth 444a being positioned at the front side in the vehicle travel direction are paired and the second left tension cloth 442b and the second right tension cloth 444b being positioned at the rear side in the vehicle travel direction are paired. However, the present embodiment is not limited to such configuration. For example, with respect to two tension cloths of each of the left and right tension cloths, the first tension cloth and the second tension cloth are alternately positioned in a longitudinal direction in the right and left sides. Specifically, in other words, it is also respectively adopted that the first left tension cloth 442a and the second right tension cloth 444b are paired and connected to each other to form one loop-shaped tension cloth, and the second left tension cloth 442b and the first right tension cloth 444a are paired and connected to each other to form another loop-shaped tension cloth. Thus, two loop-shaped tension cloths are crossed to each other at the top and bottom areas thereof when viewed in a cross-sectional view from above. These two loop-shaped tension cloths pass through the reinforcement pipe 160. Further, in the present embodiment, two pairs of the left and right tension cloths are provided. However, the present embodiment is not limited to such configuration. For example, it is also adopted that three or more pairs of the left and right tension cloths can be provided.

Further, in the present embodiments explained above, the left and right tension cloths are provided for the pair of airbags 130a and 130b. Further, (the lower parts of) the left and right tension cloths are connected by the lower tension cloth. However, the embodiments are not limited to such configuration. For example, the left tension cloth, the right tension cloth, and the lower tension cloth are formed by one (single) continuously extended cloth member. Such configuration can obtain the same effects as the above embodiments.

Although the preferred embodiments of the present invention have been described with reference to the attached drawings, the above-described embodiments are preferred examples of the present invention, and other embodiments can also be carried out in various ways. Unless there is a limited description in the specification, the present invention should not be limited to the detailed shape, size, configuration, and arrangement of parts shown in the attached drawings. Further, the expressions and terms used in the specification are for illustrative purposes, and unless there is a limited description, the same are not limited thereto.

Accordingly, it will be apparent to one of ordinary skill in the art to conceive various modifications within the scope of the claims. All such modifications are intended to be included within the technical scope of the present invention.

The present invention can be used for the occupant restraint device that restrains the occupant sitting in the seat of the vehicle.

The occupant restraint device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An occupant restraint device for a vehicle seat, the occupant restraint comprising:
   right and left airbags stored inside right and left sides of a seat back of the vehicle seat, the right and left airbags being expandable and deployable on right and left sides of an occupant sitting in the vehicle seat, respectively;
   right and left tension cloths connected to outer surfaces of the right and left airbags, respectively; and
   a lower tension cloth disposed inside a seat cushion of the vehicle seat, the lower tension cloth continuously connected between a lower part of the right tension cloth and a lower part of the left tension cloth,
   wherein the lower tension cloth is movable in right and left directions with respect to the occupant sitting in the vehicle seat, and
   when the right and left airbags are expanded and deployed, the right tension cloth, the left tension cloth, and the lower tension cloth are configured to push the expanded and deployed right and left airbags toward the occupant.

2. The occupant restraint device according to claim 1, wherein the right and left tension cloths are configured with a plurality of right and left tension cloths, respectively.

3. The occupant restraint device according to claim 2, wherein:
   one of the plurality of right tension cloths is paired with a corresponding one of the plurality of left tension cloths, and
   the lower tension cloth is continuously connected between lower parts of the paired right and left tension cloths.

4. The occupant restraint device according to claim 3, wherein:
   the paired right and left tension cloths is configured with a plurality of the paired right and left tension cloths including first and second paired right and left tension cloths, and
   a first paired right and left tension cloths alternate with a second paired right and left tension cloths on right and left airbags in a vehicle travel direction.

5. The occupant restraint device according to claim 4, further comprising:
   a reinforcement pipe disposed inside the seat cushion, the reinforcement pipe extending along a vehicle width direction,
   wherein the lower tension cloth passes through an inside of the reinforcement pipe.

6. The occupant restraint device according to claim 5, wherein the reinforcement pipe is flat-shaped in a cross-sectional view.

7. The occupant restraint device according to claim 4, further comprising:
   right and left guide members disposed in right and left sides of the seat cushion, respectively, each of the right and left guide members having an opening,
   wherein the lower tension cloth is inserted into the openings of the right and left guide members.

8. The occupant restraint device according to claim 3, further comprising:
   a reinforcement pipe disposed inside the seat cushion, the reinforcement pipe extending along a vehicle width direction,
   wherein the lower tension cloth passes through an inside of the reinforcement pipe.

9. The occupant restraint device according to claim 8, wherein the reinforcement pipe is flat-shaped in a cross-sectional view.

10. The occupant restraint device according to claim 3, further comprising:
    right and left guide members disposed in right and left sides of the seat cushion, respectively, each of the right and left guide members having an opening,
    wherein the lower tension cloth is inserted into the openings of the right and left guide members.

11. The occupant restraint device according to claim 2, further comprising:
    a reinforcement pipe disposed inside the seat cushion, the reinforcement pipe extending along a vehicle width direction,
    wherein the lower tension cloth passes through an inside of the reinforcement pipe.

12. The occupant restraint device according to claim 11, wherein the reinforcement pipe is flat-shaped in a cross-sectional view.

13. The occupant restraint device according to claim 2, further comprising:
    right and left guide members disposed in right and left sides of the seat cushion, respectively, each of the right and left guide members having an opening,
    wherein the lower tension cloth is inserted into the openings of the right and left guide members.

14. The occupant restraint device according to claim 1, further comprising:
    a reinforcement pipe disposed inside the seat cushion, the reinforcement pipe extending along a vehicle width direction,
    wherein the lower tension cloth passes through an inside of the reinforcement pipe.

15. The occupant restraint device according to claim 14, wherein the reinforcement pipe is flat-shaped in a cross-sectional view.

16. The occupant restraint device according to claim 1, further comprising:
right and left guide members disposed in right and left sides of the seat cushion, respectively, each of the right and left guide members having an opening,
wherein the lower tension cloth is inserted into the openings of the right and left guide members.

17. The occupant restraint device according to claim 1, in combination with the vehicle seat.

18. A method of protecting an occupant of a vehicle with the occupant restraint device according to claim 1, the method comprising:
expanding and deploying the right and left airbags; and
pushing the right and left airbags toward the occupant with the right, left and lower tension cloths.

19. The occupant restraint device according to claim 1, wherein the lower tension cloth is movably positioned within the seat cushion in a crosswise direction.

20. An occupant restraint device for a vehicle seat in combination with the vehicle seat, the occupant restraint comprising:
right and left airbags stored inside right and left sides of a seat back of the vehicle seat, the right and left airbags being expandable and deployable on right and left sides of an occupant sitting in the vehicle seat, respectively;
right and left tension cloths connected to outer surfaces of the right and left airbags, respectively; and
a lower tension cloth movably disposed in a crosswise direction inside a seat cushion of the vehicle seat, the lower tension cloth continuously connected between a lower part of the right tension cloth and a lower part of the left tension cloth,
wherein the right tension cloth, the left tension cloth, and the lower tension cloth cooperate to push the right and left airbags toward the occupant upon deployment of the right and left airbags.

\* \* \* \* \*